(12) United States Patent
Kylström (10) Patent No.: US 9,863,386 B2
(45) Date of Patent: Jan. 9, 2018

(54) METHOD AND DEVICE FOR OPERATION OF A HIGH PRESSURE FUEL PUMP

(71) Applicant: SCANIA CV AB, Södertälje (SE)

(72) Inventor: Kim Kylström, Tullinge (SE)

(73) Assignee: SCANIA CV AB (SE)

( * ) Notice: Subject to any disclaimer, the term of this patent is extended or adjusted under 35 U.S.C. 154(b) by 257 days.

(21) Appl. No.: 14/892,057

(22) PCT Filed: May 22, 2014

(86) PCT No.: PCT/SE2014/050626
§ 371 (c)(1),
(2) Date: Nov. 18, 2015

(87) PCT Pub. No.: WO2014/189457
PCT Pub. Date: Nov. 27, 2014

(65) Prior Publication Data
US 2016/0108879 A1    Apr. 21, 2016

(30) Foreign Application Priority Data

May 23, 2013 (SE) .................................. 1350627

(51) Int. Cl.
*F02M 63/02* (2006.01)
*F02D 41/22* (2006.01)
(Continued)

(52) U.S. Cl.
CPC ......... *F02M 63/027* (2013.01); *F02D 41/221* (2013.01); *F02M 59/022* (2013.01);
(Continued)

(58) Field of Classification Search
CPC .. F02M 63/027; F02M 63/0225; F02M 59/04; F02M 59/022; F02M 59/366;
(Continued)

(56) References Cited

U.S. PATENT DOCUMENTS

| 5,201,294 A | 4/1993 | Osuka |
| 5,715,786 A | 2/1998 | Seiberth |

(Continued)

FOREIGN PATENT DOCUMENTS

| DE | 103 41 788 A1 | 4/2005 |
| DE | 10 2009 045 369 A1 | 4/2011 |

(Continued)

OTHER PUBLICATIONS

Extended European Search Report dated Jan. 13, 2017 in corresponding European Patent Application No. 14 800 790.9 (with English language translation)(total 10 pages).

(Continued)

*Primary Examiner* — Hung Q Nguyen
*Assistant Examiner* — Xiao Mo
(74) *Attorney, Agent, or Firm* — Ostrolenk Faber LLP (57) ABSTRACT

In a high pressure pump in a system for fuel injection in a combustion engine, determining whether a predetermined partial load operating condition prevails in the combustion engine, at which one single of several pump elements (10) in the high pressure pump is capable of alone delivering a fuel pressure requested in an accumulator tank (6), according to a first reference value, and to achieve a reproducible increase of the fuel pressure to a second reference value. If applicable, the high pressure pump's pump elements are controlled so that one single pump element alone delivers the fuel pressure in the accumulator tank according to the first reference value, whereupon this reference value is changed to the second reference value, and the actual development of the pressure in the accumulator tank as a function of time is determined, and compared with stored values of similar developments for the determination of information regarding the pump element's performance ability.

14 Claims, 5 Drawing Sheets

(51) Int. Cl.
  *F02M 59/02* (2006.01)
  *F02M 59/04* (2006.01)
  *F02D 41/38* (2006.01)
  *F02D 41/08* (2006.01)
  *F02M 59/08* (2006.01)
  *F02M 59/36* (2006.01)

(52) U.S. Cl.
  CPC ........ *F02M 59/04* (2013.01); *F02M 63/0225* (2013.01); *F02D 41/08* (2013.01); *F02D 41/3845* (2013.01); *F02D 2041/224* (2013.01); *F02D 2250/31* (2013.01); *F02M 59/08* (2013.01); *F02M 59/366* (2013.01); *Y02T 10/40* (2013.01)

(58) Field of Classification Search
  CPC . F02M 59/08; F02D 41/221; F02D 2041/224; F02D 2250/31; F02D 41/08; F02D 41/3845; Y02T 10/40
  See application file for complete search history.

(56) References Cited

U.S. PATENT DOCUMENTS

| | | |
|---|---|---|
| 6,526,948 B1 | 3/2003 | Stavnheim et al. |
| 9,309,829 B2 | 4/2016 | Radeczky et al. |
| 2008/0302174 A1 | 12/2008 | Puckett et al. |
| 2009/0138179 A1 | 5/2009 | Felton |
| 2009/0150046 A1 | 6/2009 | Achleitner et al. |
| 2011/0132321 A1 | 6/2011 | Pursifull |

FOREIGN PATENT DOCUMENTS

| | | |
|---|---|---|
| DE | 10 2010 027 675 A1 | 1/2012 |
| DE | 10 2011 075 870 A1 | 11/2012 |
| EP | 2 072 792 A2 | 6/2009 |
| EP | 2 085 603 A1 | 8/2009 |
| WO | WO 2013/034479 A1 | 3/2013 |

OTHER PUBLICATIONS

International Search Report dated Sep. 25, 2014 issued in corresponding International patent application No. PCT/SE2014/050626.

METHOD AND DEVICE FOR OPERATION OF A HIGH PRESSURE FUEL PUMP

CROSS-REFERENCE TO RELATED APPLICATIONS

The present application is a 35 U.S.C. §§371 national phase conversion of PCT/SE2014/050626, filed May 22, 2014, which claims priority of Swedish Patent Application No. 1350627-4, filed May 23, 2013, the contents of which are incorporated by reference herein. The PCT International Application was published in the English language.

FIELD OF THE INVENTION

The present invention pertains to a method for operation of a high pressure pump in a system for fuel injection in a combustion engine. The high pressure pump comprises at least two pump elements, which are connected in parallel between a low pressure part of the system and an accumulator tank for fuel injection to the combustion engine. Each element has a cylinder with a pump chamber with a moveable piston therein for pumping, and an inlet valve arranged in this cylinder's connecting opening to the low pressure part, which may be controlled in order to control the flow of fuel into the pump chamber, and a further device.

Thus the invention is not limited to any certain type of combustion engine or fuel, and diesel and ethanol may be mentioned as a couple of non-exhaustive examples of fuel. The invention also pertains to the operation of a high pressure pump for supply of fuel to combustion engines designed for all types of use, such as in industrial applications, crushing machines and in various types of motor vehicles, even though the invention is particularly applicable to wheeled motor vehicles, especially commercial vehicles, such as trucks and buses, and will for this reason sometimes be discussed in this application with the objective of elucidating, but not limiting, the invention.

Further, the invention pertains only to matters relating to the so-called high pressure part of a system for fuel injection in a combustion engine, and the low pressure part and the equipment for supply of fuel in this may have any appearance.

BACKGROUND TECHNOLOGY

It is a naturally constant endeavor to optimize the operation of a high pressure pump, which may be done for example by diagnosis of failing and/or limited performance of any part of the high pressure pump for operation of the high pressure pump, while taking this into consideration for optimal use of the high pressure pump or fixing of degraded parts of the maintenance or replacement. Thus, limited performance ability of the high pressure pump may be due to the occurrence of a leakage in one or several of the pump elements between the inlet valve and the pump chamber's connecting opening to the low pressure part, e.g. because of a somewhat damaged valve, or leakage between the piston and the pump chamber wall because of wear particles having got caught in the fuel and damaging the wall.

U.S. Pat. No. 6,526,948 B1 describes a method which facilitates a determination, through pressure measurements, of whether a pump element, or the entire high pressure pump in a system for fuel injection in a combustion engine, has failed.

SUMMARY OF THE INVENTION

The objective of the present invention is to provide a method and a device of the type defined above, which are improved in at least some respect in relation to prior art methods and devices of this type, with respect to the possibility of optimizing the operation of the high pressure pump.

By controlling the pump elements, when a predetermined partial load condition prevails in the combustion engine, so that one single element of the high pressure pump's pump elements delivers a fuel pressure in the accumulator tank on its own according to a first reference value, and then changing the reference value to a second reference value and investigating how the fuel pressure in the accumulator tank then develops over time, then by comparison with stored values of such developments, be determined whether the pump element performs as it should, or performs inadequately, or whether it has failed, i.e. is no longer able to perform its pump function. This information may be used to create an error code if an impaired performance ability of the pump element in question is determined. This information may also be used to maximize the use of the pump element in question if it turns out to have a very good performance ability.

The invention concerns a method and a device that performs it. Broadly, the method concerns operation of a high pressure pump in a system for fuel injection in a combustion engine. The system includes a low pressure part of the system and an accumulator tank for fuel injection to the combustion engine. Each accumulator tank has a cylinder defining a pump chamber with a moveable piston therein for pumping.

The high pressure pump comprises at least two pump elements which are connected in parallel between the low pressure part of the system and the accumulator tank. The cylinder has a connecting opening to the low pressure part. An inlet valve in the connecting opening is controllable in order to control a flow of fuel into the pump chamber.

The method comprises the steps of:
a) determining whether a predetermined partial load condition prevails in the combustion engine, at which condition one of the pump elements is alone capable delivering a fuel pressure requested in the accumulator tank according to a first reference value ($P_1$), and is capable to achieve a reproducible increase of the fuel pressure to a second reference value ($P_2$), and if this operating condition prevails, to continue the method with the following steps:
b) controlling the high pressure pump's pump elements, so that a single one of the pump elements alone delivers a fuel pressure in the accumulator tank (6) according to the reference value ($P_1$), c) changing the reference value for the fuel pressure in the accumulator tank to the second reference value ($P_2$), while maintaining the control of the pump elements so that the single pump element alone delivers the requested fuel pressure in the accumulator tank,
d) determining the fuel pressure in the accumulator tank as a function of time during the build-up of the fuel pressure to the second reference value, and
e) comparing development of the fuel pressure in the accumulator tank, while stored values of such developments, in order to determine information about the pump element's performance ability.

Details as to the system for fuel injection and to various ways to perform the steps in the method are disclosed below.

According to one embodiment of the invention, the comparison is thus carried out with a nominal curve for the predetermined partial load conditions for the development of the fuel pressure in the accumulator tank, between the first and the second reference value in a pump element. The nominal curve may represent the development over time which the fuel pressure in the accumulator tank is intended to have for an adequately functioning pump element, and the curve may be provided by the manufacturer of the high pressure pump. If it takes longer for the pump element to achieve reaching a fuel pressure according to the second reference value in the accumulator tank, than as displayed by the nominal curve, the function of the pump element is therefore worse than the expected.

According to another embodiment of the invention, the method comprises a comparison with a minimum curve ($P_{min}$), stored for the predetermined partial load condition, which shows the longest time acceptable required for a said pump element to change the fuel pressure in the accumulator tank from the first reference value ($P_1$) to the second reference value ($P_2$), at the predetermined partial load condition in the combustion engine. Should this comparison show that it takes longer than specified by this minimum curve to reach a fuel pressure in the accumulator tank according to the second reference value, the pump element may then be classified as having failed and requiring maintenance or replacement of parts thereof.

According to another embodiment of the invention, at the comparison in step e), the development of the fuel pressure in the accumulator tank during the development is compared with the development of the fuel pressure in the accumulator tank when the steps b)-d) are carried out previously in the pump element. Thus, it becomes possible to determine whether the pump element maintains a good performance ability or has lost its performance ability over time.

According to another embodiment of the invention, during the comparison in step e), the development of the fuel pressure in the accumulator tank during the development is compared to the development of the fuel pressure in the accumulator tank when the steps b)-d) are previously carried out in other pump elements of the high pressure pump. Thus, it becomes possible to determine how the pump element's performance ability compares to other pump elements of the high pressure pump.

According to another embodiment of the invention, the steps b)-d) are carried out in all the pump elements of the high pressure pump at different times when a predetermined partial load condition prevails, and for each pump element the development of the fuel pressure in the accumulator tank in step e) is compared, as a function of the time of the change of the reference value from the first to the second value, with this development in this or the other pump elements, and based on this comparison the pump elements are ranked according to efficiency. Such a ranking of the pump elements as regards their efficiency makes it possible to take decisions about suitable maintenance of a certain specific pump element, but primarily to optimize the operation of the high pressure pump, by minimizing the use of the pump element which has a poorer performance and maximising the use of the pump element which has a higher efficiency.

According to one embodiment of the invention, which constitutes a further development of an embodiment, this is achieved by controlling—when a partial load condition exists in the combustion engine, at which one element of the pump elements is capable of delivering the fuel pressure requested in the accumulator tank on its own—the high pressure pump's pump element, so that the pump element with the highest efficiency alone delivers the requested fuel pressure. By using one single pump element when this is possible and thus using the one with the highest efficiency, minimization of both energy usage and generation of noise is achieved through the operation of the high pressure pump.

According to another embodiment of the invention, the method is carried out in a high pressure pump with more than two of the pump elements, and—when a partial load condition exists in the combustion engine, at which two pump elements are capable together of delivering a fuel pressure requested in the accumulator tank—the high pressure pump's pump elements are controlled so that both pump elements with the highest determined efficiency jointly deliver the requested fuel pressure, which leads to a maximizing of the level of usage of the high pressure pump.

According to another embodiment of the invention, the steps b)-d) are repeated for one of the pump element with time intervals, through which changes in the pump elements' function may be discovered. Thus the time intervals could be adaptive, and be adapted according to the result which the performance of the method generates.

According to another embodiment of the invention, the method is carried out during the predetermined operating condition in the combustion engine, in the form of a first reference value for the fuel pressure in the accumulator tank when the combustion engine idles. At idling of the combustion engine and "acceleration" thence to a fuel pressure in the accumulator tank according to the second reference value, a reproducible increase of the fuel pressure may be achieved. It is also suitable to carry out the method according to the invention when the combustion engine is losing idle. "Idle" as used herein means that the combustion engine is in operation without driving anything with its output shaft and without any acceleration. Thus, when the combustion engine is arranged in a wheeled motor vehicle, the method may advantageously be carried out when the motor vehicle has stopped, for example at a traffic light, and then starts by the driver pressing the gas pedal to the bottom, which constitutes a predetermined partial load condition with a perfectly reproducible increase of the fuel pressure, toward the second reference value in the accumulator tank.

According to another embodiment of the invention, the method comprises storage of the data produced in step d), in order to provide for the possibility of a later assessment of the condition of the pump elements in the high pressure pump. Thus, during maintenance of the high pressure pump, its parts, which require it, may be appropriately corrected.

The invention also provides a device, which is equipped with the features of the invention.

The invention also pertains to a computer program, a computer program product and a motor vehicle according to the invention.

Other advantageous features and advantages with the invention are set out in the description below.

BRIEF DESCRIPTION OF THE DRAWINGS

Below are descriptions of example embodiments of the invention with reference to the enclosed drawings, in which.

DETAILED DESCRIPTION OF EMBODIMENTS ACCORDING TO THE INVENTION

Figure 1:
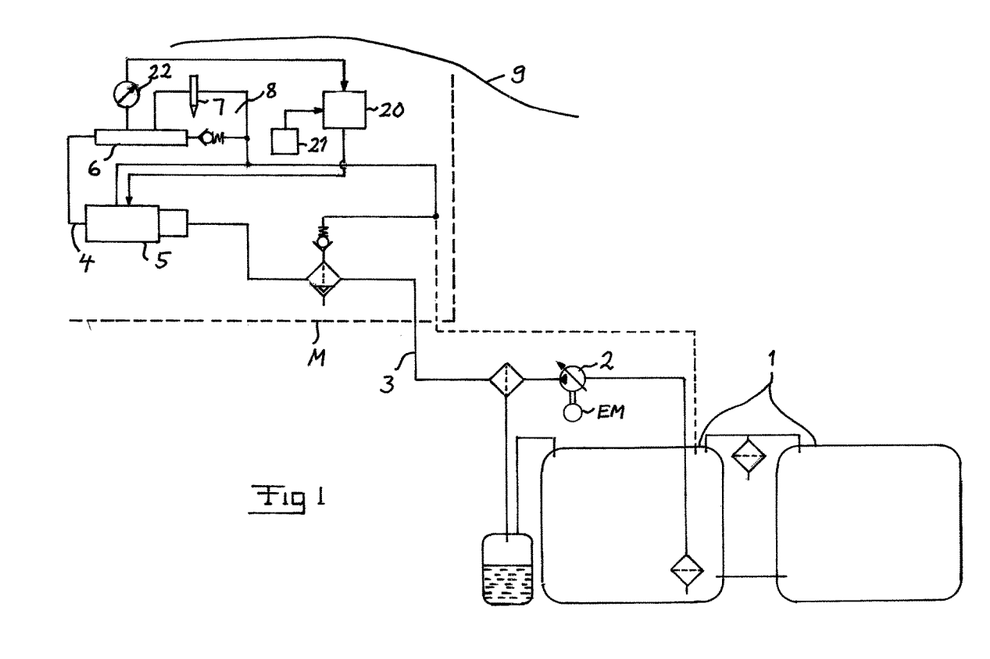
FIG. 1 is a schematic view illustrating the structure of a system for fuel injection to a combustion engine, comprising a device according to an embodiment of the invention, for the performance of a method according to the invention.

FIG. 1 shows a system for fuel injection in a combustion engine equipped with a device according to the invention, and to which methods according to the invention described hereafter are applicable. The general structure of the system is prior art and comprises a fuel tank 1, which is here divided into two containers. Fuel is fed via a feeding pump 2 operated by an electric engine EM, in a low pressure part 3 with a pressure of, for example, 2-6 bar, is fed to a high pressure part 4 of the system, which starts with a high pressure pump 5. At a high pressure, for example in the range of 500-2,500 bar, the pump 5 pumps fuel to an accumulator tank 6 with nozzles 7 for injection of fuel into the cylinders of a combustion engine 8, which is here arranged in a motor vehicle identified with the digit 9. The components which are shown inside the frame M are here arranged on the combustion engine.

Figure 2:
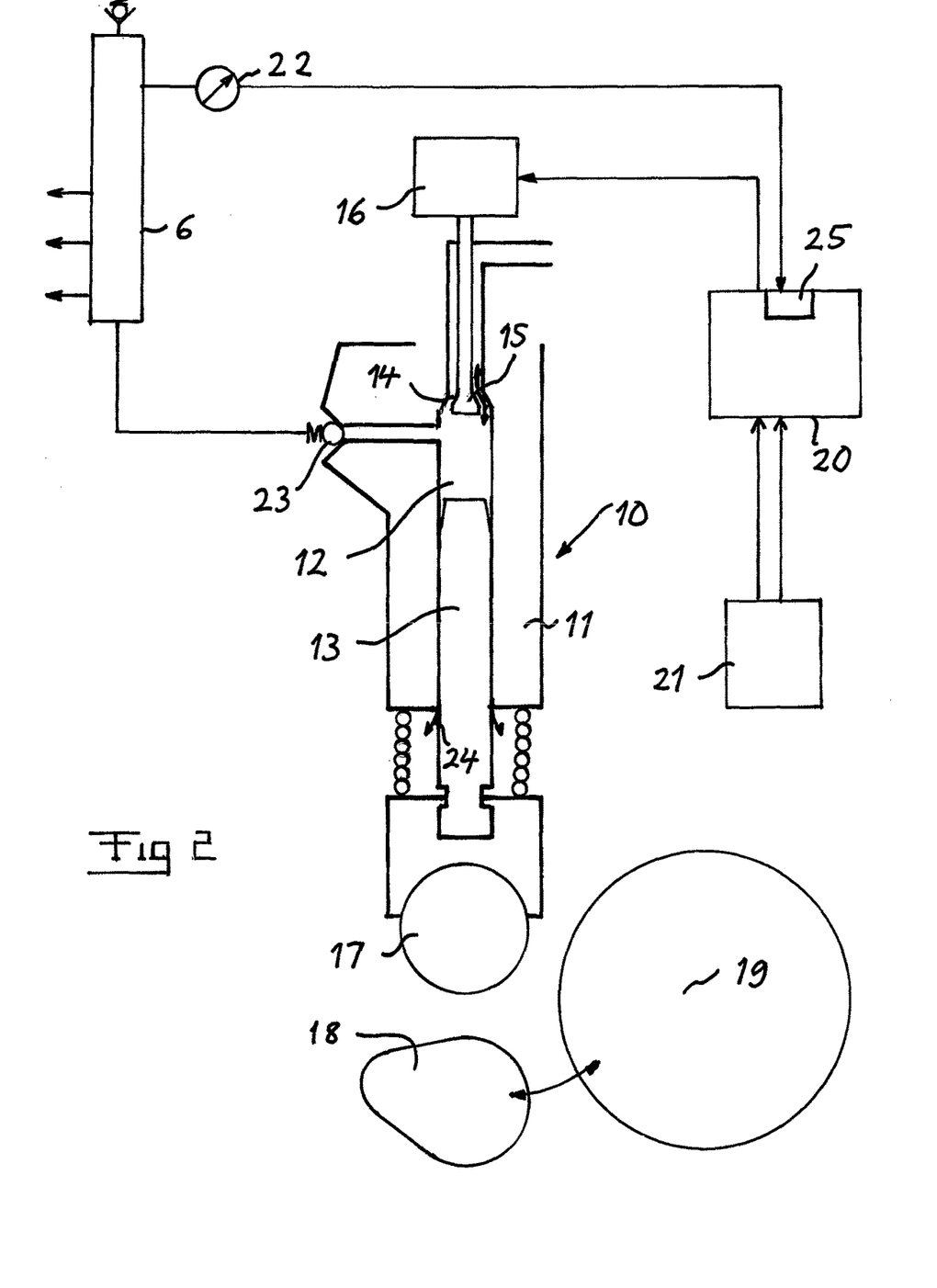
FIG. 2 is a simplified view illustrating the structure and function of a pump element in a high pressure pump in a system according to FIG. 1.

FIG. 2 helps explanation of the structure and function of the high pressure pump 5 I. The high pressure pump comprises at least two pump elements, usually 2-3 pump elements, but the number is selectable and may be for example 8. The pump elements are connected in parallel between the low pressure part 3 of the system and the accumulator tank 6 for fuel injection to the combustion engine. FIG. 2 shows only one of these pump elements 10, but they all have the same design and are controlled in the same manner. Each pump element has a cylinder 11 with a pump chamber 12 with a moveable piston 13 for pumping therein, and an inlet valve 15 in the cylinder's connecting opening 14 to the low pressure part, which is controllable via an actuator 16 in order to control the flow of fuel into and/or out of the pump chamber 12. Specifically, the pumping of fuel is effected via a pump element 10, through a lifter 17 connected with the piston 13 being impacted by a camshaft 18, which is mechanically connected to the combustion engine's crankshaft 19, so that the piston 13 will move forwards and backwards in the pump chamber 12 in accordance with the rotation of the engine crankshaft 19. The actuator 16 of the inlet valve 15 is controlled by control signals from a control device 20, which in turn obtains information regarding the engine crankshaft's or the camshaft's momentary position, and thus the position of the piston 13 via engine position sensors 21. The engine control device 20 also obtains information from a means 22 adapted to measure the fuel pressure in the accumulator tank 6.

Generally this means that when the piston 13 moves in FIG. 2, seen in the downwards direction and the pump chamber volume increases, the actuator 16 controls the inlet valve 15 so that it moves in the same direction, so that fuel may pass through the valve 15 in the connecting opening 14 and be sucked into the pump chamber 12. When the piston 13 then is in the region of its lowest position with maximum pump chamber volume, the actuator 16 controls the inlet valve 15, so that it moves upwards to abut against the walls defined in the connecting opening 14 and fit tightly against these, so that on subsequent piston upstrokes in the pump chamber, existing fuel is compressed and pressed out past a check valve 23 toward the accumulator tank 6 in order to be injected into the cylinders of the combustion engine via this tank. Thus, the pump elements may each have a conduit to the accumulator tank, or as indicated in FIG. 1, a joint conduit from the high pressure pump to the accumulator tank.

The function of a pump element may be degraded mainly through two different types of leakage. One is due to fuel leaking past the piston 13, as indicated with the arrows 24, since the piston does not seal tightly against the surrounding pump chamber walls. This may be due to wear particles having entered the fuel and damaged the pump chamber walls. The other type of leakage is a leakage past the inlet valve 15, from the pump chamber to the low pressure part 3, when the piston 13 is in the fuel compression phase and the inlet valve must fully close the connecting opening 14. This may be due to the valve being damaged, for example due to wear and tear.

There now follows a description of the characterizing features of the invention, which pertain to the operation itself of a high pressure pump of the type described above, and the possibility of improving this, both with respect to diagnosing a failed and/or limited performance and making the pumping function itself more efficient. How a method according to one embodiment of the invention is carried out, will now be described with reference also to FIG. 3 which shows the fuel pressure P in the accumulator tank 6 as a function of time t. Thus $P_1$ is a first reference value, which the control device 20 provides to the actuator 16, and $P_2$ is a second, higher reference value, which the device 20 provides to the actuator 16.

Figure 3:
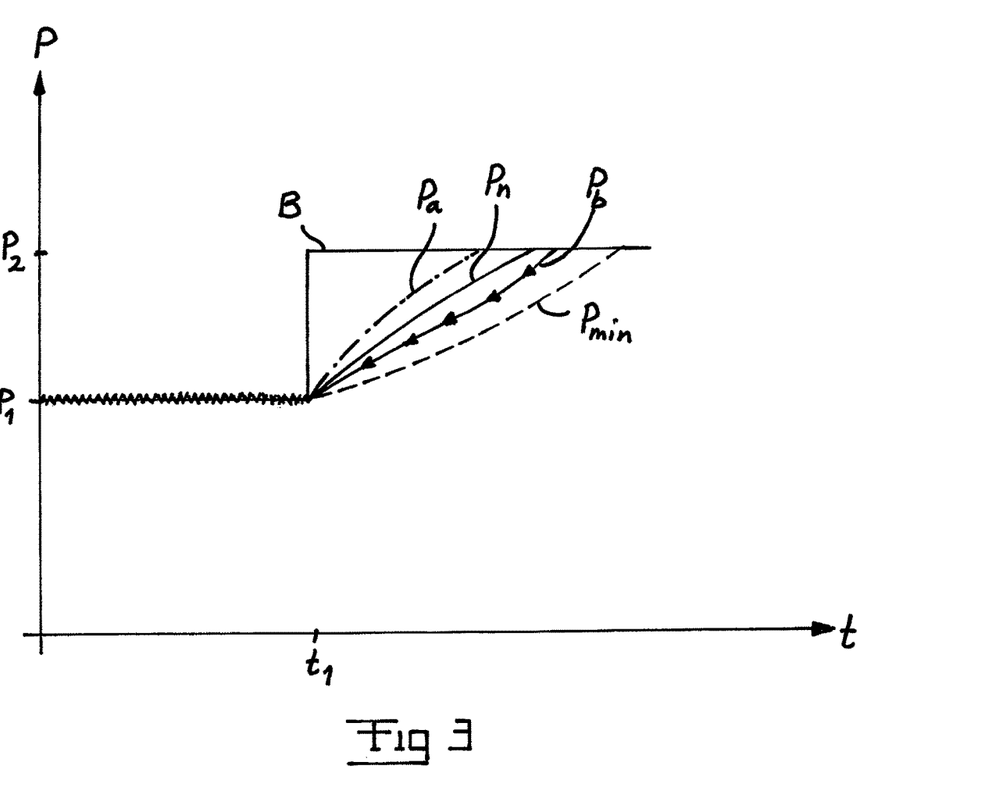
FIG. 3 is a diagram which shows the fuel pressure in the accumulator tank connected to a high pressure pump over time, when the method according to the invention is carried out.

When the method according to the invention is carried out, it is first determined/tested via a schematically designated element 40 whether a predetermined partial load condition exists in the combustion engine, at which a single one of the pump elements 10 is capable of alone delivering a fuel pressure requested in the accumulator tank according to the first reference value $P_1$ at a first level, and to achieve a reproducible increase of the fuel pressure to the second reference value $P_2$ at a second level. A suitable such predetermined partial load condition is when the combustion engine idles, and in the event this is arranged in a motor vehicle, e.g. in a truck or a bus, this may occur when this vehicle stops, e.g. at a traffic light. If the occurrence of this operating condition has been determined, the method continues by selection of one of the pump elements, and by the high pressure pump's pump elements being controlled, so that this single pump element alone delivers a fuel pressure in the accumulator tank according to the first reference value $P_1$. Subsequently, at a time $t_1$ the reference value for the fuel pressure in the accumulator tank is changed to the second reference value $P_2$, which is illustrated by the reference line B, while the control of the only pump element continues, which alone delivers the requested fuel pressure in the accumulator tank. At the same time, the fuel pressure in the accumulator tank is measured as a function of time, while this builds up to the second level, and the curves $P_a$ and $P_b$ show two examples of possible developments of the fuel pressure in the accumulator tank.

FIG. 3 illustrates a nominal curve $P_n$ for the development of the fuel pressure in the accumulator tank between the first and the second reference value in a said pump element, as the development should be according to the pump element's specification from the factory, and a minimum curve $P_{min}$, showing the longest acceptable time required for the pump element to change the fuel pressure in the accumulator tank from the first reference value to the second reference value, at the given predetermined partial load condition in the combustion engine. During the performance of the method according to the invention, the development of the fuel pressure in the accumulator tank, while the fuel pressure builds up therein from said first to said second level, is compared to stored values of such developments in order to prepare information about the pump element's performance ability. Such comparisons are made via a schematically displayed device 25 in FIG. 2, which interacts with the control device 20. Thus the comparison may for example be made with the nominal curve and/or the minimum curve. Should the pressure build-up take longer than as specified by the minimum curve, the pump element in question could be deemed to be faulty and an error code is created for replacement of some part of the pump element or of the entire pump element, as soon as possible. The comparison could however also be made with developments obtained by previous performances of the method according to the invention on the pump element in question, in order to control whether its performance ability has changed, or with similar developments in other pump elements comprised in the high pressure pump.

Thus it is possible to carry out, alternately, the method according to the invention on the different pump elements comprised in the high pressure pump, in order to compare the development in each one of these with the development in the others and thus to rank the pump elements according to efficiency. Thus, in the event a partial load condition arises in the combustion engine, at which not all of the pump elements must be used to deliver the fuel pressure requested in the accumulator tank, the pump element(s) with the highest ranking, i.e. the highest efficiency, may be selected in order to save energy. If the use of only one pump element is required to achieve a requested pressure in the accumulator tank, the pump element with the highest efficiency is then selected, so that noise generated by the high pressure pump and energy consumption may be minimized. Assuming that the curves Pa and Pb have been obtained for two of the high pressure pump's pump elements, accordingly the use of the pump element according to Pa would be prioritized over the use of the one according to Pb.

FIG. 3 shows, through the development of $P_a$, that it is even possible that a pump element may function somewhat better than as provided by its specification.

In a fuel system of a wheeled motor vehicle, the method according to the invention could e.g. be carried out for a first of the pump elements at ten consecutive stops of the vehicle, such as at traffic lights, and then ten or some other suitable number of times for the second of the pump elements etc.

Figure 4:
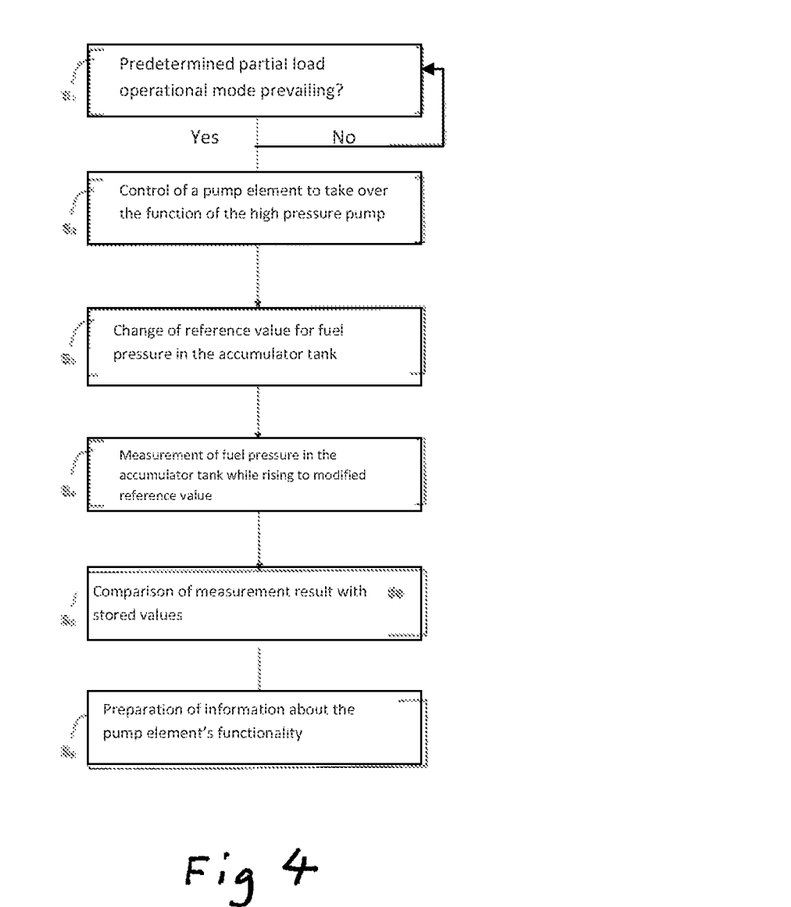
FIG. 4 is a flow chart showing a method according to one embodiment of the invention.

FIG. 4 shows a flow chart which illustrates a method according to one embodiment of the invention, for operation of a high pressure pump in a system for fuel injection in a combustion engine. In a first step $S_1$, it is determined whether a predetermined partial load condition prevails. In the event of an affirmative answer to this question, a second step $S_2$ ensues, in which the pump elements are controlled so that one of the pump elements takes over the function of the high pressure pump. Subsequently, in step $S_3$ the reference value for the fuel pressure in the accumulator tank is changed, and following that, in step $S_4$, the fuel pressure in the accumulator tank is determined while this pressure is rising to the changed reference value. Subsequently, in step $S_5$ a comparison of the measurement results relating to the fuel pressure with stored values ensues, and through this comparison, in step $S_6$ information regarding the functionality of the pump elements is produced.

A computer program code for the implementation of a method according to the invention is suitably included in a computer program, loadable into the internal memory of a computer, such as the internal memory of an electronic control device of a combustion engine. Such a computer program is suitably provided via a computer program product comprising a data storage medium readable by an electronic control device, the data storage medium of which has the computer program stored thereon. The said data storage medium is e.g. an optical data storage medium in the form of a CD-ROM, a DVD, etc., a magnetic data storage medium in the form of a hard disk drive, a diskette, a cassette, etc., or a Flash memory or a ROM, PROM, EPROM or EEPROM type memory.

Figure 5:
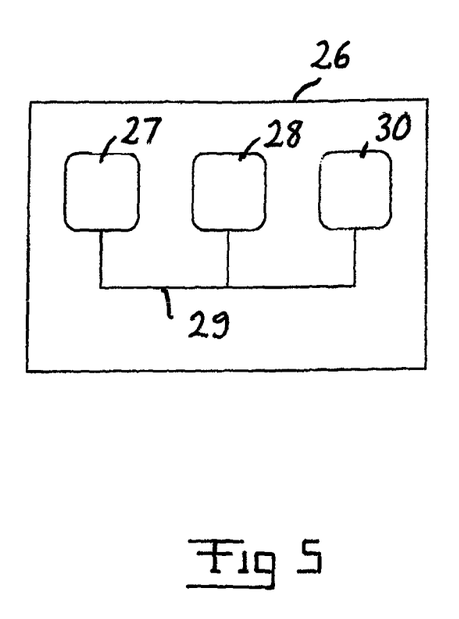
FIG. 5 is a diagram of an electronic control device for the implementation of a method according to the invention.

FIG. 5 illustrates very schematically an electronic control device 26 comprising execution means 27, such as a central processor unit (CPU), for the execution of computer software. The execution means 27 communicates with a memory 28, e.g. a RAM memory, via a data bus 29. The control device 26 also comprises a data storage medium 30, e.g. in the form of a Flash memory or a ROM, PROM, EPROM or EEPROM type memory. The execution means 27 communicates with the data storage means 30 via the data bus 29. A computer program comprising computer program code for the implementation of a method according to the invention, for example in accordance with the embodiment illustrated in FIG. 4, is stored on the data storage medium 30.

The invention is obviously not limited in any way to the embodiments described above, but numerous possible modifications thereof should be obvious to a person skilled in the area, without such person departing from the spirit of the invention as defined by the appended claims.

For example, the system for fuel supply on which the method according to the invention is applied, may appear different than as displayed in FIG. 1. It is possible, for example, for the feeding pump not to be controlled through mechanical connection with the combustion engine and not to be controllable independently of the combustion engine. The appearance of the high pressure pump's pump elements could also be different from what is illustrated schematically in FIG. 2.

Is respect of the fuel, it would be fully possible to carry out the method on a combustion engine, which is operated with a fuel which is gaseous at the pressure prevailing in the low pressure part, but which becomes liquid in the high pressure part, such as for example DME (dimethyl).

For example, more than two reference values for the fuel pressure in the accumulator tank could be used. Thus the distance between two consecutive reference values could be of different magnitudes.

The distance between said two reference values could also potentially be varied, i.e. at least one of the reference values could be changed between different times for the performance of the method.

The methods could very well be carried out in the form of workshop tests. This also applies where the combustion engine is arranged in a motor vehicle.

The invention claimed is:

1. A method for operation of a high pressure pump in a system for fuel injection in a combustion engine, wherein the system comprises:
   a low pressure part of the system and an accumulator tank for fuel injection to the combustion engine, each accumulator tank has a cylinder defining a pump chamber with a moveable piston therein for pumping;
   the high pressure pump comprises at least two pump elements which are connected in parallel between the low pressure part of the system and the accumulator tank;
   the cylinder has a connecting opening to the low pressure part;

an inlet valve in the connecting opening is controllable in order to control a flow of fuel into the pump chamber, the method comprises the steps of:
a) determining whether a predetermined partial load condition prevails in the combustion engine, at which condition one of the pump elements is alone capable to delivery a fuel pressure requested in the accumulator tank according to a first reference value ($P_1$), and is capable to achieve a reproducible increase of the fuel pressure to a second reference value ($P_2$), and if this operating condition prevails, to continue the method with the following steps:
b) controlling the high pressure pump's pump elements, so that a single one of the pump elements alone delivers a fuel pressure in the accumulator tank according to the reference value ($P_1$),
c) changing the reference value for the fuel pressure in the accumulator tank to the second reference value ($P_2$), while maintaining the control of the pump elements so that the single pump element alone delivers the requested fuel pressure in the accumulator tank,
d) determining the fuel pressure in the accumulator tank as a function of time during the build-up of the fuel pressure to the second reference value,
e) comparing development of the fuel pressure in the accumulator tank, while the fuel pressure builds up in the accumulation tank, with stored values of such developments, in order to determine information about the pump element's performance ability; and
f) controlling the high pressure pump's pump elements based on the determined performance ability.

2. A method according to claim 1, wherein step e) carrying out the comparison in step e) with a nominal curve ($P_n$) stored for predetermined partial load conditions, for development of the fuel pressure in the accumulator tank between the first ($P_1$) and the second ($P_2$) reference value in a said pump element.

3. A method according to claim 2, further comprising performing the comparison with a minimum curve ($P_{min}$) stored for a predetermined partial load condition in step e), for showing the longest time acceptable required for the pump element to change the fuel pressure in the accumulator tank from the first reference value ($P_1$) to the second reference value ($P_2$) at the predetermined partial load condition in the combustion engine.

4. A method according to claim 1, further comprising, at the comparison in step e), comparing the development of the fuel pressure in the accumulator tank during build-up with the development of the fuel pressure in the accumulator tank at previous performances of steps b)-d) in the pump element or in other pump elements in the high pressure pump.

5. A method according to claim 1, further comprising carrying out steps b)-d) in all the pump elements of the high pressure pump at different times when the predetermined partial load condition prevails; and
for each pump element, in step e) comparing the development of the fuel pressure in the accumulator tank, as a function of the time at the change of the reference value from the first to the second reference value, with the development in this or the other pump elements, and based on this comparison, ranking the pump elements according to efficiency.

6. A method according to claim 5, further comprising when a partial load condition arises in the combustion engine, at which one of the pump elements is capable of alone delivering the fuel pressure requested in the accumulator tank, controlling the high pressure pump's pump elements so that the pump element with the highest efficiency alone delivers the requested fuel pressure.

7. A method according to claim 5, wherein the method is carried out on a high pressure pump with more than two of the pump elements, the method further comprising:
when a partial load condition arises in the combustion engine, and at which two pump elements are capable of jointly delivering a fuel pressure requested in the accumulator tank, controlling the high pressure pump's pump elements so that both pump elements with the highest determined efficiency jointly deliver the requested fuel pressure.

8. A method according to claim 1, further comprising:
repeating the steps b)-e) for the same pump elements at time intervals.

9. A method according to claim 1, carried out during the predetermined operating condition of the combustion engine, in the form of a first reference value ($P_1$) of the fuel pressure in the accumulator tank, when the combustion engine idles.

10. A device for the operation of a high pressure pump in a system for fuel injection in a combustion engine, wherein
the high pressure pump comprises at least two pump elements;
a low pressure part of the system and an accumulator tank for fuel injection to the combustion engine, the two pump elements are connected in parallel between the low pressure part and the accumulator tank;
each pump element has a cylinder with a pump chamber and a moveable piston in the cylinder for pumping, the cylinder having a connecting opening to the low pressure part, an inlet valve arranged in the connecting opening, the inlet valve being controllable to control the flow of fuel into the pump chamber;
an element configured to control the pump elements to deliver a fuel pressure in the accumulator tank, according to a reference value requested for this purpose;
the device comprises:
elements configured to detect the occurrence of a predetermined partial load condition in the combustion engine, at which one of the pump elements is capable of alone delivering a fuel pressure requested in the accumulator tank according to a first reference value ($P_1$), and is capable to achieve a reproducible increase of the fuel pressure to a second reference value ($P_2$), in the event the one element detects such occurrence, the control device is programmed to control the high pressure pump's pump elements so that the one of the pump elements alone delivers a fuel pressure in the accumulator tank according to the first reference value, and to control changing the reference value of the fuel pressure in the accumulator tank to the second reference value while the control of the high pressure pump's pump elements is maintained, so that only the one pump element alone delivers the fuel pressure requested in the accumulator tank;
during the build-up of the fuel pressure in the accumulator tank from the first reference value to the second reference value, means programmed to determine the fuel pressure in the accumulator tank as a function of time and a device programmed to compare development of the fuel pressure in the accumulator tank during the build-up thereof with stored values of such developments, in order to produce information regarding the pump element's performance ability; and the control device is programmed to control the high pressure pump's pump elements based on the produced performance ability.

11. A device according to claim 10, wherein if the elements detect the occurrence of the predetermined partial load condition, the control device is configured to control each one of the high pressure pump's pump elements at different times alone, for delivering a fuel pressure in the accumulator tank according to the first reference value ($P_1$), followed by a change of the reference value to the second reference value ($P_2$), the means are configured to carry out the determination for each of the pump elements, and the device is configured to carry out the comparison with the development of the fuel pressure in the accumulator tank in the pump elements or the other pump elements, and based thereon to rank the pump elements according to efficiency.

12. A device according to claim 11, further comprising at the occurrence of a partial load operating condition in the combustion engine, at which one of the pump elements is capable of alone delivering the fuel pressure requested in the accumulator tank, the control device is configured to control the high pressure pump's pump elements, so that the pump element with the highest efficiency alone delivers the requested fuel pressure.

13. A computer program product comprising a non-transitory data storage medium which is readable by a computer, the computer program comprises a computer program stored on the medium; the computer program comprises program code, which may be downloaded from the readable medium and which is configured to cause the computer to control the steps according to claim 1, when the computer program is run on a computer.

14. A motor vehicle, comprising a device according to claim 10.

* * * * *